(No Model.)

D. G. MILLER.
BOB SLED.

No. 264,322. Patented Sept. 12, 1882.

WITNESSES:
Thos. Houghton.
W. Read

INVENTOR:
D. G. Miller
BY
ATTORNEYS.

UNITED STATES PATENT OFFICE.

DELBERT G. MILLER, OF WATERVILLE, MINNESOTA.

BOB-SLED.

SPECIFICATION forming part of Letters Patent No. 264,322, dated September 12, 1882.

Application filed January 25, 1882. (No model.)

*To all whom it may concern:*

Be it known that I, DELBERT G. MILLER, of Waterville, in the county of Le Sueur and State of Minnesota, have invented a new and Improved Bob-Sled; and I do hereby declare that the following is a full, clear, and exact description of the same, reference being had to the accompanying drawings, forming a part of this specification, in which—

Figure 1:
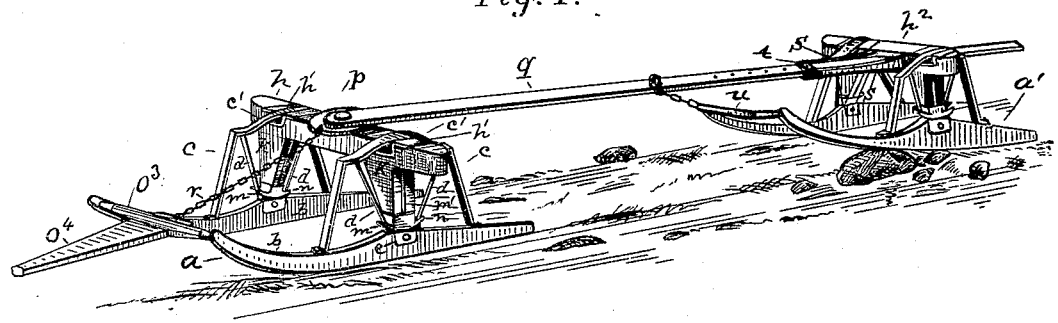
Figure 2:
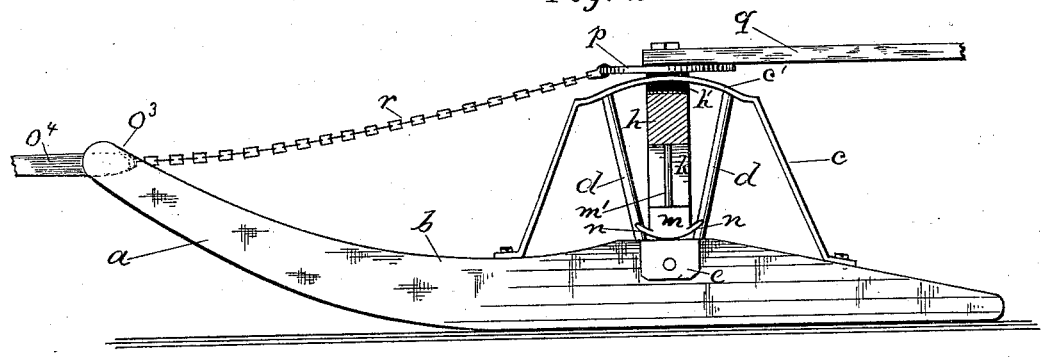
Figures 3, 4:
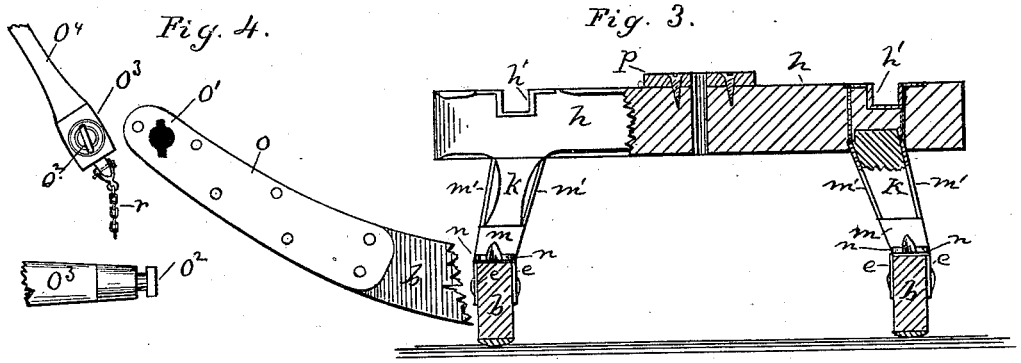

Figure 1 is a perspective view of my improved bob-sled. Fig. 2 is a side elevation of the front bob-sled, and Figs. 3 and 4 are detail views.

My invention relates to improvements in bob-sleds; and it consists in the peculiar construction and arrangement of the parts, as hereinafter more fully set forth.

In the accompanying drawings, $a$ represents the front, and $a'$ the hind, bob-sled, similarly constructed, so that a description of the front bob-sled will answer for both.

$b$ $b$ represent the runners of the front bob-sled, of the usual construction, to each of which, near its middle, is secured a standard, $c$, consisting of a metallic bar bent in the form of a trapezoid, with its top arched, as shown at $c'$.

$d$ $d$ represent two inclined rods secured at their lower ends to the upper face of each runner, with a space between them, and thence spreading outwardly and upwardly, or diverging from each other, and having their upper ends secured respectively to the extremities of the arch $c'$ of the standard $c$. The spaces on the upper faces of each runner between the lower ends of the rods $d$ $d$ are covered with metallic plates $e$ $e$.

$h$ represents the transverse beam of the front bob-sled, provided with knees $k$ $k$, depending from its lower face directly over the runners $b$ $b$, and provided with recesses on its upper face, immediately over the knees, covered by the recessed metallic plates $h'$ $h'$, the arched tops $c'$ of the standards $c$ fitting in the recesses in the metallic plates $h'$, and adapted to vibrate longitudinally therein. The lower end of each knee $k$ fits into a rocking metallic socket, $m$, provided with parallel rods $m'$ on its opposite sides, which extend vertically up along the opposite sides of the knee, passing vertically through the beam and the metallic plate $h'$, to which they are secured. The lower faces of the sockets $m$, on the lower ends of the knees $k$, are curved and rest on the metallic plates $e$ $e$, on the top of the runners, between the rods, and each socket is provided at its opposite ends with projections $n$ $n$, adapted each to embrace one of the rods $d$ near its lower end, thereby confining each knee between the rods, and allowing either runner to rise or fall at either end in the arc of a vertical circle when meeting an obstruction, the arches $c'$ of the top of the standards moving in the recesses in the transverse beam $h$ of the front bob-sled.

To the inner faces of the front ends of the runners are secured curved metallic plates $o$, conforming to the curvature of the runners at their front ends. The plates $o$ are provided near their forward ends with elongated slots $o'$, opening into recesses in the runners, and adapted to receive the T-heads of bolts $o^2$ on the ends of a cross-bar, $o^3$, to which the tongue $o^4$ is centrally secured when the tongue is held up vertically, or nearly so, the cross-bar carrying the tongue when the latter is depressed from its vertical position, being thus jointed at each end to a runner, so that one runner can be moved independently of the other, and not follow or partake of the movement of the other, each runner accommodating itself to the undulations of the ground and riding over obstructions in its path without at all affecting the movement of the other runner.

$p$ represents a circle-plate secured to the center of the transverse beam of the front bob-sled, and provided with a central hole, to which a reach, $q$, connecting the front and hind bob-sleds, is secured. $r$ represents a chain secured at its rear end to the circle-plate $p$, and attached at its forward end to the cross-bar $o^3$, connected with the tongue to hold the beam $h$ in position. The reach $q$ extends back and passes through the transverse beam $h^2$ of the hind bob-sled, $a'$. The beam $h^2$ of the hind bob-sled, $a'$, is attached to the reach $q$ by hounds or reach-braces $s$ $s$, connected together at their forward ends by a band, $t$, through which the reach $q$ passes and is allowed to play loosely. The hind bob-sled, $a'$, is attached to the reach $q$, in front of the hounds $s$, by a short tongue, $u$, secured to a cross-bar jointed to the runners of the hind bob-sled at their front ends, in the same manner as the tongue and cross-bar are jointed to the front bob-sled, the forward end of the short tongue $u$ being secured to the reach $q$.

What I claim as my invention is—

1. The combination, with the runners $b\ b$, standards $c$, having arched tops $c'$, and inclined rods $d$, secured to the runners and standards, of the recessed transverse beam $h$, knees $k\ k$, and sockets $m$, provided with projections $n\ n$, substantially as described.

2. The combination, with the runners $b\ b$, standards $c$, having arched tops $c'$, inclined rods $d$, recessed beam $h$, and knees $k$, provided with sockets $m$, having projections $n$, of the plates $o$, secured to the front ends of the runners, and provided with the elongated slots $o$, tongue $o^4$, and cross-bar $o^3$, having end T-headed bolts, $o^2$, substantially as described, and for the purpose set forth.

DELBERT G. MILLER.

Witnesses:
JOHN N. BEACH,
WILLIAM H. FULLER.